United States Patent [19]
Lemon

[11] 3,985,063
[45] Oct. 12, 1976

[54] HYDRAULIC CONTROL SYSTEM
[75] Inventor: Robert W. Lemon, Farmington, Mich.
[73] Assignee: Borg-Warner Corporation, Chicago, Ill.
[22] Filed: Aug. 30, 1974
[21] Appl. No.: 501,925

[52] U.S. Cl. .................................. 91/31; 60/413; 91/6; 92/60; 138/31; 192/109 F
[51] Int. Cl.² .................................. F15B 13/04
[58] Field of Search .................. 91/31, 27; 138/31; 60/413; 192/109 F, 85 R; 92/60

[56] References Cited
UNITED STATES PATENTS

| | | | |
|---|---|---|---|
| 586,598 | 7/1897 | French | 138/31 X |
| 897,676 | 9/1908 | Thompson | 138/31 |
| 1,384,216 | 7/1921 | Smith | 91/27 |
| 1,663,647 | 3/1928 | Brush | 138/31 X |
| 2,567,715 | 9/1951 | Keusch et al. | 91/27 X |
| 2,775,255 | 12/1956 | Snyder | 138/31 X |
| 2,807,968 | 10/1957 | Förster | 192/109 F X |
| 3,164,034 | 1/1965 | Kelley | 74/732 |
| 3,568,711 | 3/1971 | Katz | 137/516.11 |
| 3,744,348 | 7/1973 | Lemon | 74/869 |

Primary Examiner—Martin P. Schwadron
Assistant Examiner—Abraham Hershkovitz
Attorney, Agent, or Firm—Robert L. Zieg

[57] ABSTRACT

An accumulator structure for use in a hydraulic control system for controlling an hydraulic motor utilized to engage a friction device in a transmission including an accumulator piston mounted in a housing, a source of fluid pressure, a valve connected between the source and the motor. A first conduit connects the valve and motor, the first conduit including a fluid restriction, and a second conduit connects the valve and the accumulator. A third conduit is provided between the accumulator and the first conduit. The accumulator includes a counter-bored portion defining together with a reduced land portion on said piston, a passage which connects the second conduit to the third conduit when the piston is in the inactive position to provide a rapid fluid fill of the motor initially. The land on the piston blocks the connection between the second and third conduits when the piston is moving between the inactive and fully "stroked" positions, and a flow path is provided in the accumulator to connect the second conduit to the third conduit again when the piston reaches its fully "stroked" position whereby in case of a leak of pressure at the servomotor, the connection between the second and third conduits will provide sufficient fluid flow to prevent a pressure drop at the hydraulic motor caused by the restriction in the first conduit under the leak condition such that sufficient engaging force is maintained to prevent slipping of the friction device.

10 Claims, 4 Drawing Figures

3,985,063

HYDRAULIC CONTROL SYSTEM

SUMMARY OF THE INVENTION

It has been known in prior art devices to utilize an accumulator in a manner such that when a servomotor is being supplied with fluid pressure a supplementary passage through the accumulator is provided to also supply pressure to the servomotor to provide an initial rapid fill. The supplemental path is incorporated to provide rapid fill since there is usually a restriction in the fluid line to the servomotor, which is utilized to control the engagement and disengagement of the servomotor, and the restriction prevents as rapid a filling of the servomotor as desirable under most conditions. The problem which has been encountered in hydraulic control systems and particularly with respect to engageable friction devices where the hydraulic motor to engage same is connected to the source through a restriction is that after the device is engaged and the accumulator is in its fully stroked position, as is normal, if there is a leak past the piston in the hydraulic motor, due to the incorporation of the restriction in the circuit, a pressure drop will occur which will reduce the engaging pressure on the friction device to the extent that slippage and damage to the friction device can occur.

The present invention uniquely solves the problem set out in that not only is a supplemental fluid path provided through the accumulator to provide for rapid fill of the hydraulic motor initially, but in addition a second path is provided through the accumulator when it is in its fully stroked position such that the source of pressure is connected to the motor through a path around the restriction in the main conduit such that minor fluid leaks in the hydraulic motor cannot cause a pressure drop sufficient to create a slipping condition in the friction device and pursuant damage thereto.

The inventive solution presented herein provides in a hydraulic control system for controlling an hydraulic motor, an accumulator having a piston, the piston being mounted in a housing, a source of fluid pressure, a valve connected to the source and the motor, a first conduit between the valve means and the motor, a second conduit between the valve and the accumulator, a third conduit between the accumulator and the first conduit, the piston having an inactive position and a fully stroked position, passage means in the accumulator, the passage means connecting said second conduit to said third conduit when said piston is in the inactive position whereby initially a rapid fluid fill of said motor is provided, the passage means being closed as the piston moves between the inactive and fully stroked positions, and the accumulator construction incorporating means defining a flow path again connecting the second and third conduits when the piston reaches the fully stroked position.

DESCRIPTION OF THE PREFERRED EMBODIMENT

Figure 1:
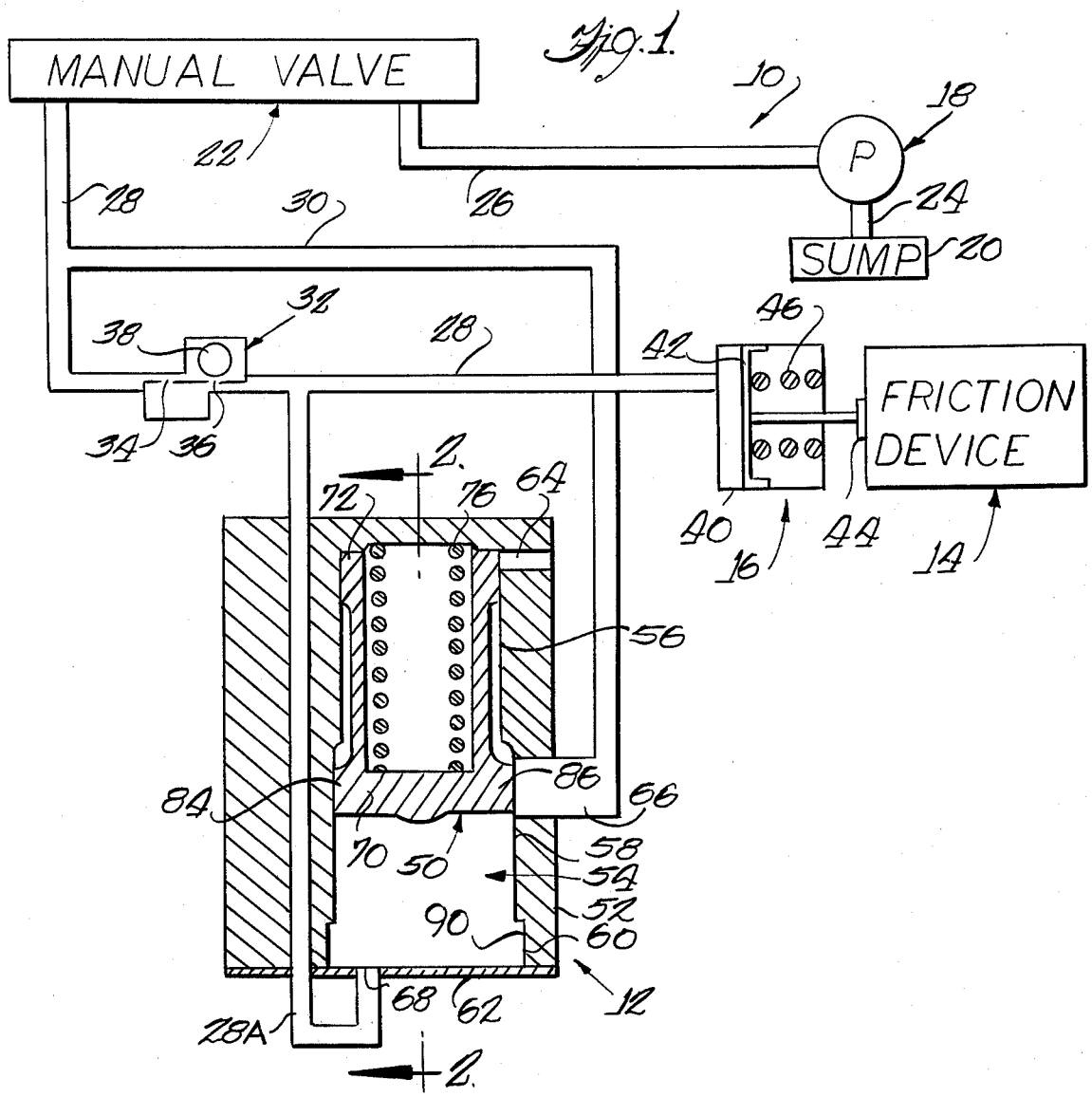
FIG. 1 is a diagramatic view of an hydraulic control mechanism for an hydraulic motor.

Referring to FIG. 1, a schematic view of a hydraulic control system 10 is presented. Hydraulic control system 10 is adapted to be a part of a more complex hydraulic control system which is adapted to control the ratio changes in an automatic transmission of a planetary type which may be, for example, a control 501926, to that disclosed in U.S. Pat. No. 3,744,348 of common assignee; the disclosure of which is incorporated herein by reference. In addition, co-pending application Ser. No. 5011926, filed Aug. 30, 1974, represents an improved control mechanism with which the present invention may be used. However, as will be apparent, the control system 10 can be utilized to control any hydraulic motor to be actuated to engage a friction clutch or brake.

The control system 10 includes an hydraulic accumulator 12 adapted to control engagement of the friction device 14 by controlling the fluid supplied to a hydraulic motor 16 adapted to engage friction device 14. A pump 18 comprising a source of fluid pressure is provided having a sump 20. A manual valve 22 is provided corresponding to manual valve 116 in the control system of U.S. Pat. No. 3,744,348.

A conduit 24 connects sump 20 to pump 18. A conduit 26 connects the pump to the manual valve 22. A first conduit 28 connects the manual valve with the motor 16. A second conduit 30 connects conduit 28 with accumulator 12. A restriction control valve 32 is provided in conduit 28. A third conduit 28A connects accumulator 12 with conduit 28 between valve 32 and motor 16.

The restriction control valve 32 includes a pair of orifices 34 and 36 and a ball 38. As will be apparent, the design of the orifice control valve 32 is such that the ball 38 is adapted to close orifice 36 when fluid pressure is flowing from the manual valve to motor 16 and when fluid pressure isexhausted from conduit 28 through the manual valve ball 38 will move from orifice 36 providing a rapid exhaust of fluid pressure from motor 16.

Hydraulic motor 16, by way of example only, may be of a common type having a housing 40 with a piston 42 therein having an actuating portion 44 extending from the housing and a return spring 46 provided to return piston from its activated position in which the friction device 14 is engaged.

Referring to U.S. Pat. No. 3,744,348 mentioned above, the accumulator 144 which corresponds to accumulator 12 herein is adapted to control engagement of friction clutch 20 which is engaged by servomotor 16. The present application constitutes an improvement over the control system of U.S. Pat. No. 3,744,348 in that improved shift quality is provided by the accumulator 12 as will be explained.

Accumulator 12 comprises a piston 50 mounted in a housing or valve body 52 having a bore 54 therein. The bore 54 has a small diameter portion 56, a larger diameter portion 58 and a counter-bored portion 60. The bore 54 is closed by an end plate 62 which may be a plate in the valve body of the transmission in which the motor 16 is incorporated. The bore 54 also includes an exhaust port 64 and a relatively large pressure port 66. Provided in the end plate 62 is a pressure pot 68. Pressure port 66 is connected to conduit 30. Port 68 is connected to conduit 28A.

Figure 3:
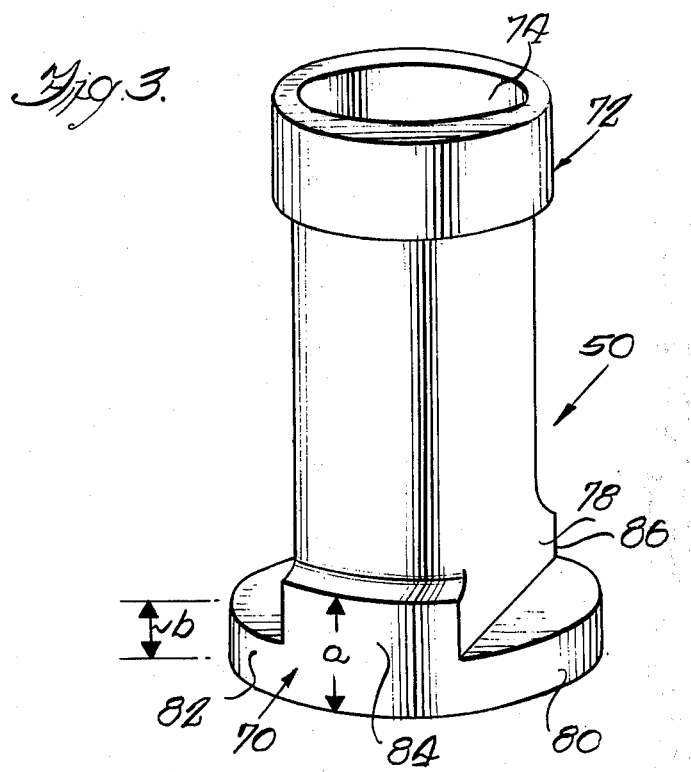
FIG. 3 is a perspective view of an accumulator piston constructed in accordance with the principles of the present invention.

Referring to FIG. 3, a perspective view is provided of the piston 50. Piston 50, in general, includes a large land 70 and a small land 72 at opposite ends of the piston. The piston is counter-bored at 74 and receives a spring 76 within the counter-bore 74 adapted to urge the piston 50 to its inactive or de-stroked position illustrated in FIG. 1. The large land 70 has slots or notches 78 cut therein in a parallel manner on opposite sides of the piston. This provides portions 80 and 82 on the land 70 which are of reduced axial length and portions 84 and 86 of greater axial length. Thus, the structure of land 70 is such that the land has a full axial length labeled small $a$ in FIG. 3 for a portion of its diameter and a smaller axial length labeled small $b$ for the remainder of the diameter where the notches 78 are cut.

Figure 2:
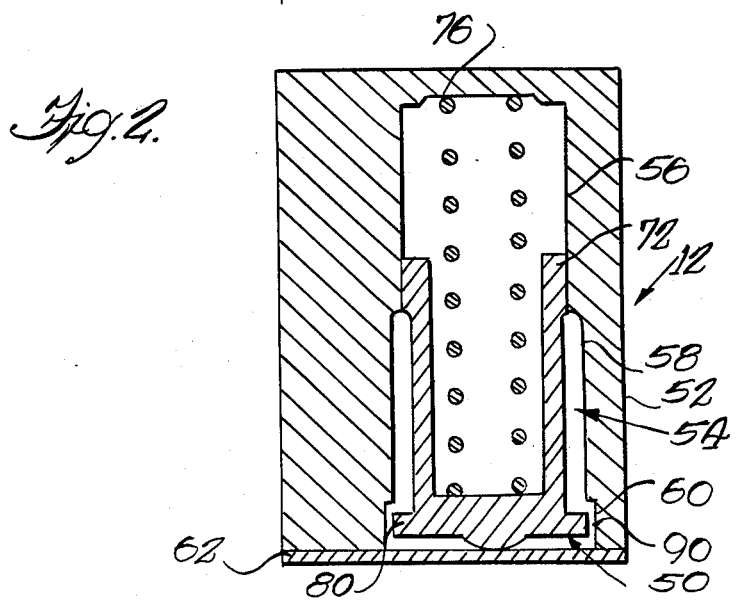
FIG. 2 is a sectional view taken along the line 2—2 of FIG. 1.

Land 72 closely fits within portion 56 of bore 54 and land 70 closely fits portion 58 of bore 54. As illustrated in FIG. 2, when piston 50 is in its inactive or de-stroked position a fluid passage 90 is defined by counter-bore 60 and the portions 80 and 82 of land 70 of reduced axial length. It will be seen that passage 90 provides fluid communication between ports 66 and 68 when the piston 50 is in the position illustrated in FIG. 2 and further that the connection between port 66 and port 68 is blocked by land 70 when piston 50 is moving up against the force of spring 76 after the small portions 80 and 82 of land 70 are engaged with bore portion 58.

It will also be apparent that when piston 50 is in its fully stroked position as shown in FIG. 1, the port 66 is of sufficient size relative to land portions 84 and 86 such that port 68 and conduit 28 are again in communication with port 66 and conduit 30.

The operation of the device described is as follows. As is in the case in known automatic transmission control systems, when the manual valve 22 is placed in a forward drive position fluid pressure will be supplied through conduit 28 to hydraulic motor 16 to engage the front clutch of the automatic transmission, for example. This conditions the transmission for forward drive condition and commonly, this cluch remains engaged for all forward drive ratios of the transmission, as in U.S. Pat. No. 3,744,348. The problem is encountered in control systems of this type in that with the high idling engines of the present time the pressure supplied by the pump 18 is sufficiently high so as to cause a clunk or jerk in the transmission when hydraulic motor is initially engaged. Thus an accumulator, such as accumulator 12, is provided to absorb the initial shock of engagement.

Fluid pressure in conduit 28 through conduit 28A acts on large land 70 of piston 50 and moves the piston 50 upwardly as viewed in FIG. 1, against the force of spring 76. This stroking or movement of the piston 50 absorbs the initial hydraulic energy to soften engagement of the friction device 14 by motor 16.

Figure 4:
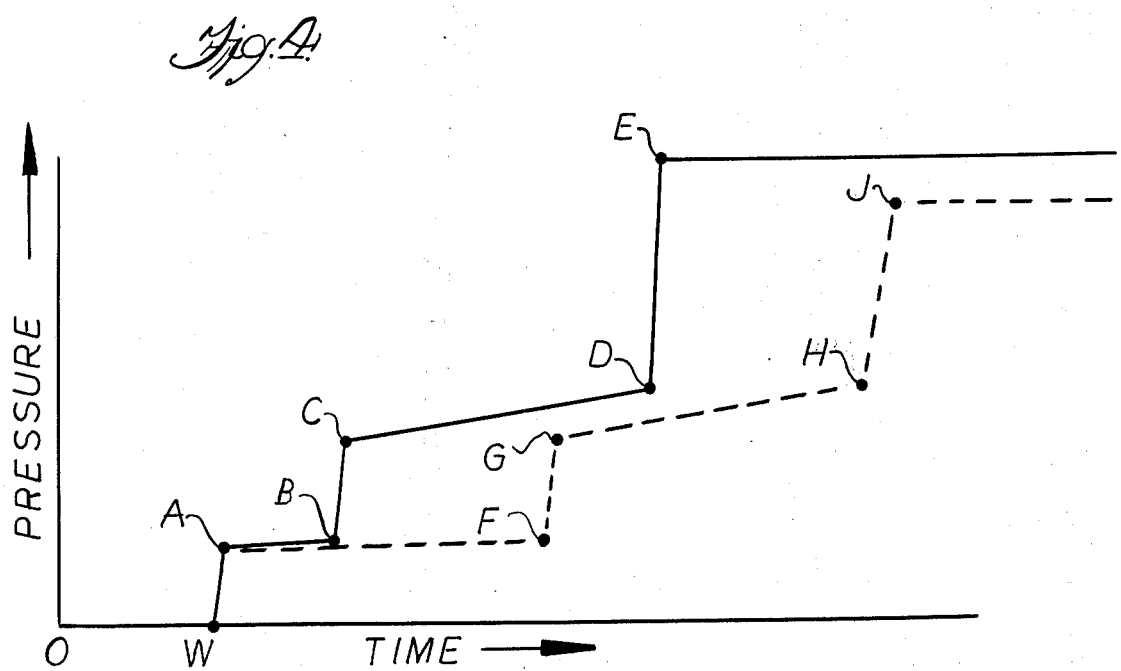
FIG. 4 is a graph showing the pressure-time relationship for the hydraulic motor of FIG. 1.

Referring to FIG. 4, a graph illustrates the time-pressure relationship of fluid pressure in the hydraulic motor 16 when a transmission ratio change is made to engage friction device 14. The full line on the graph of FIG. 4 shows the pressure increase per unit of time when friction device 14 is engaged. The dotted line shows the pressure time relationship for prior art devices. During the period of time between the zero pressure point W and the A point, the pressure is increasing at a uniform rate and during this period the frictional drag of piston 42 and initial force of spring 46 is overcome. Between points A and points B and F, piston 42 is moving to take up the slack in friction device 14. The pressure buildup between points B-C and F-G represents the pressure increase to overcome the initial spring force in the accumulator and the force on the differential area between lands 70 and 72. Points C and G represent the point at which the accumulator piston 50 begins stroking, thus the rate of pressure increase between points C and D and G and H respectively is more gradual since the accumulator is delaying pressure buildup. Points D and H represent the point at which the accumulator piston is fully stroked, as illustrated in FIG. 1 and the hydraulic pressure begins a rapid buildup to the points E and J which are the fully engaged pressure levels to hold friction device 14 engaged. Without the acccumulator within the circuit, pressure would increase at a much more rapid rate between points C-E and G-J and the shift would be very harsh. As described above, the pressure in conduits 28, 28A and 30 is a pressure which varies with engine torque demand and vehicle speed. This pressure is applied to the differential area between lands 70 and 72 through port 66 and will act to vary the response time of engagement of friction device 14 (and therefore the location of line C-D) with respect to the pressure scale depending upon vehicle speed and engine torque demand. Use of a differential area in connection with variation of the accumulator response time is important in that by changing the differential area the location of the C point on the graph representing initiation of stroking of piston 50 can easily be varied so that the ratio change may be varied to tailor the transmission for specific environments. The graph of FIG. 4 illustrates the improvement of a rapid fluid fill provided by the unique structure of the present invention in reducing the time to reach point B as compared to point F, the reduced time between point D and point E as compared to the time between points H and J, and the reduced overall time to reach point E as compared to the time required to reach point J in prior art devices.

In the control system 10 illustrated, branch conduit 30 in addition received fluid pressure from conduit 28 when conduit 28 is connected to receive pressure by manual valve 22. While piston 50 is in its inactive or de-stroked position, as illustrated in FIG. 2, passage 90 is open and connects port 66 and 68 so that fluid pressure in conduit 30 flows through pasage 90 and port 68 into conduit 28A to supplement the flow of pressure into conduit 28 through orifice 34. In this manner it will be seen that initially a rapid fill of motor 16 is provided by means of passage 90 provided in accumulator 12. This initial supplementary flow takes up the slack or moves the piston 42 of motor 16 to loosely engage the friction device 14. Then as the pressure begins to rapidly buildup, as engagement begins to take place, the accumulator piston 50 will move up to absorb the shock of engagement.

After piston moves up far enough so that land 70 closes passage 90, pressure in conduit 30 acts on the differential area between large land 70 and small land 72 to produce a force resisting upward movement of piston 50. When the present system is used in an automatic transmission as disclosed in U.S. Pat. No. 3,744,348 the pressure in conduit 30 is line pressure which is regulated to be responsive to engine torque and vehicle speed responsive. Thus, with the present invention after the land 70 blocks passage 90 the accumulator 12 will be engine torque and vehicle speed responsive in its functioning as is desirable and more fully described in U.S. Pat. No. 3,744,348.

Thus, it will be seen that the accumulator piston 50 is used as a timing device to provide supplementary fill of hydraulic motor 16 and to time the length of time in which supplementary flow is supplied to motor 16. Thus by modifying a known accumulator by providing the counter-bore 60 and passage 90, rather than adding a valve of further controls, a very simple and convenient means of providing and timing supplementary fill of a hydraulic motor is accomplished.

In addition, when the accumulator piston reaches its fully stroked position shown in FIG. 1, the port 66 being of larger axial extent than land portions 84 and 86 will define a flow path around land 70 connecting conduit 30 and conduits 28. Thus in the fully stroked position of the accumulator servomotor 16 is again connected to supply conduit 28 around or bypassing restriction 34. As will be apparent, this function is crucial since if a leak occurs in the servomotor 16 the full fluid pressure will be maintained by this additional flow path whereas in prior art devices, due to restriction 34, a leak at the servomotor could create a pressure drop in the line to the servomotor which could reduce engaging pressure on friction device 14 such that it would be unable to handle the torque load and slip.

What is claimed is:

1. In a hydraulic control system for controlling an hydraulic motor, an accumulator having a piston, said piston being mounted in a housing, a source of fluid pressure, valve means connected to said source and to said motor, a first fluid connection between said valve means and said motor, restricting means positioned in said first fluid connection; a second fluid connection between said valve means and said accumulator, a third fluid connection between said accumulator and said first fluid connection, said third fluid connection connected to said first fluid connection between said restricting means and said motor downstream of said restricting means, said piston having an inactive position and a fully stroked position, passage means in said accumulator, said passage means connecting said second fluid connection to said third fluid connection when said piston is in said inactive position whereby initially a rapid fluid fill of said motor will be provided, means closing said passage means as said piston moves between the inactive and fully stroked positions of said piston, and means defining a flow path again connecting said second and third fluid connections when said piston reaches said fully stroked position to complete a bypass around said restricting means in said fully stroked position.

2. A hydraulic control system as claimed in claim 1 wherein said piston has a large land having portions of reduced axial length, said portions together with said accumulator housing defining said passage means.

3. A hydraulic control system as claimed in claim 2 wherein said piston is actuated when said second fluid connection rceives fluid pressure whereby said piston will move from its inactive position and block said passage means.

4. A hydraulic control system as claimed in claim 3 wherein said housing has a counter-bore partially defining said passage means.

5. A hydraulic control system as claimed in claim 4 wherein biasing means are provided in said housing urging said piston to its inactive position.

6. In a hydraulic control system for controlling an hydraulic motor for engagement of a friction device in a transmission, an accumulator having a piston, said piston being mounted in a housing, a source of fluid pressure, a valve connected to said source and to said motor, a first conduit between said valve means and said motor, a fluid restriction in said first conduit, a second conduit between said valve and said accumulator, a third conduit between said accumulator and said first conduit, said third conduit connected to said first conduit between said restriction and said motor downstream of said restriction, said piston having an inactive position and a fully stroked position, passage means in said accumulator, said passage means connecting said second conduit to said third conduit when said piston is in said inactive position whereby initially a rapid fluid fill of said motor will be provided, means closing said passage means as said piston moves between the inactive and fully stroked positions of said piston, and means defining a bypass flow path again connecting said second and third conduits when said piston reaches said fully stroked position whereby a bypass flow path around said restriction between said valve and said motor is provided in said fully stroked position.

7. A hydraulic control system as claimed in claim 6 wherein said piston has a large land having portions of reduced axial length, said portions together with said accumulator housing defining said passage means.

8. A hydraulic control system as claimed in claim 7 wherein said piston is actuated when said second conduit receives fluid pressure whereby said piston will move from its inactive position and block said passage means.

9. A hydraulic control system as claimed in claim 8 wherein said housing has a counter-bore partially defining said passage means.

10. A hydraulic control system as claimed in claim 9 wherein biasing means are provided in said housing urging said piston to its inactive position.

* * * * *